Jan. 30, 1923.
J. J. KOVACH.
SPRING WHEEL.
FILED APR. 18, 1922.
1,443,478.
4 SHEETS—SHEET 1.
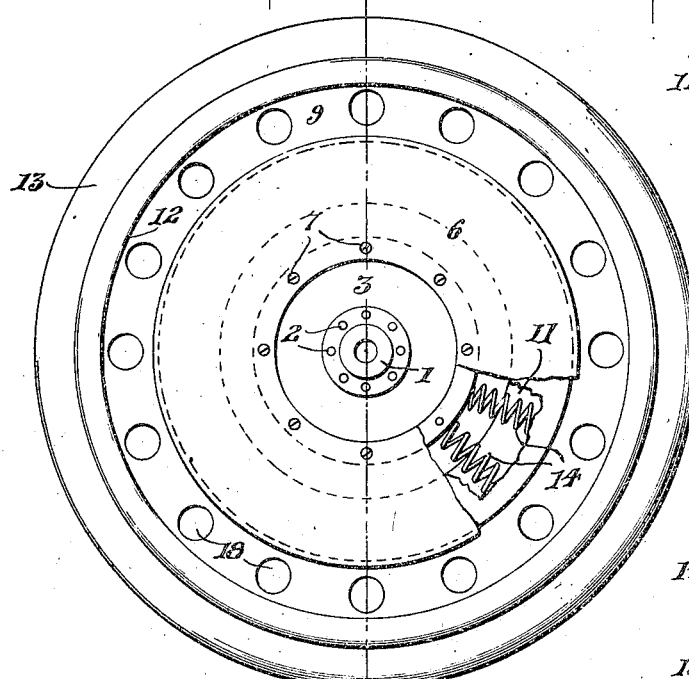
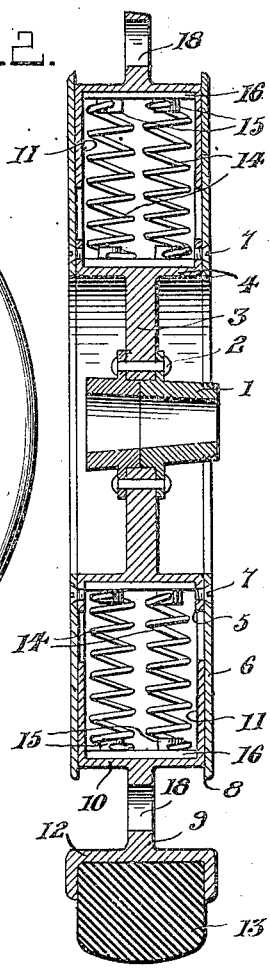
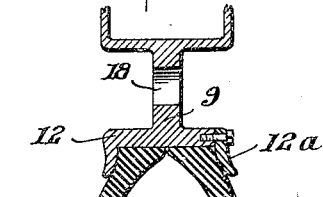
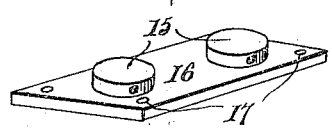
Inventor
J. J. Kovach
By F. K. Bryant, Attorney.

Jan. 30, 1923. 1,443,478.
J. J. KOVACH.
SPRING WHEEL.
FILED APR. 18, 1922. 4 SHEETS—SHEET 2.
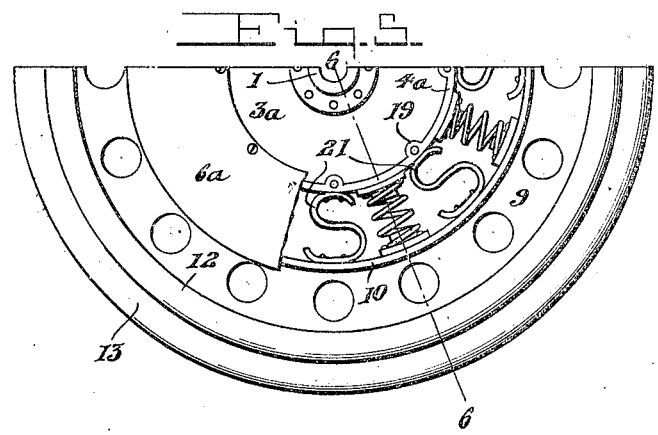
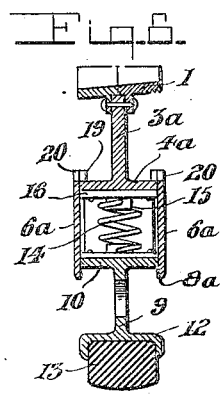
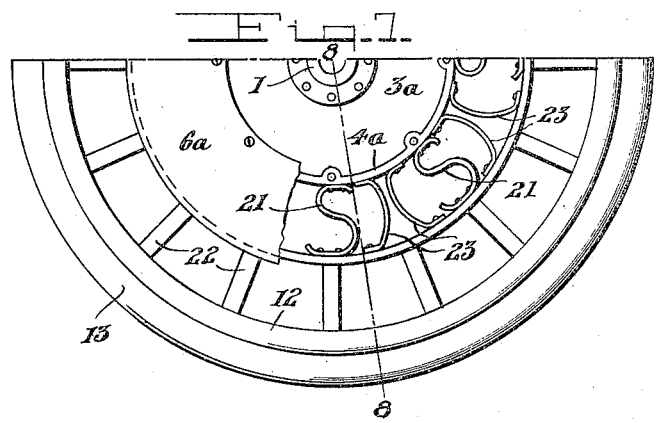
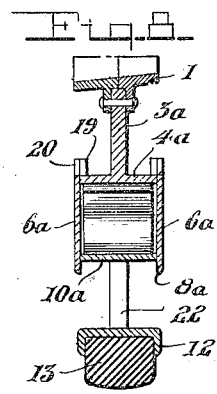
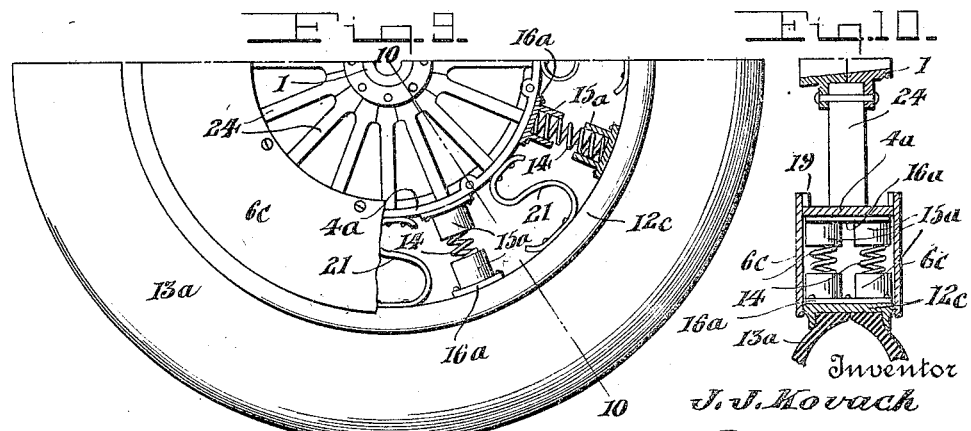
Inventor
J. J. Kovach
By F. K. Bryant,
Attorney.

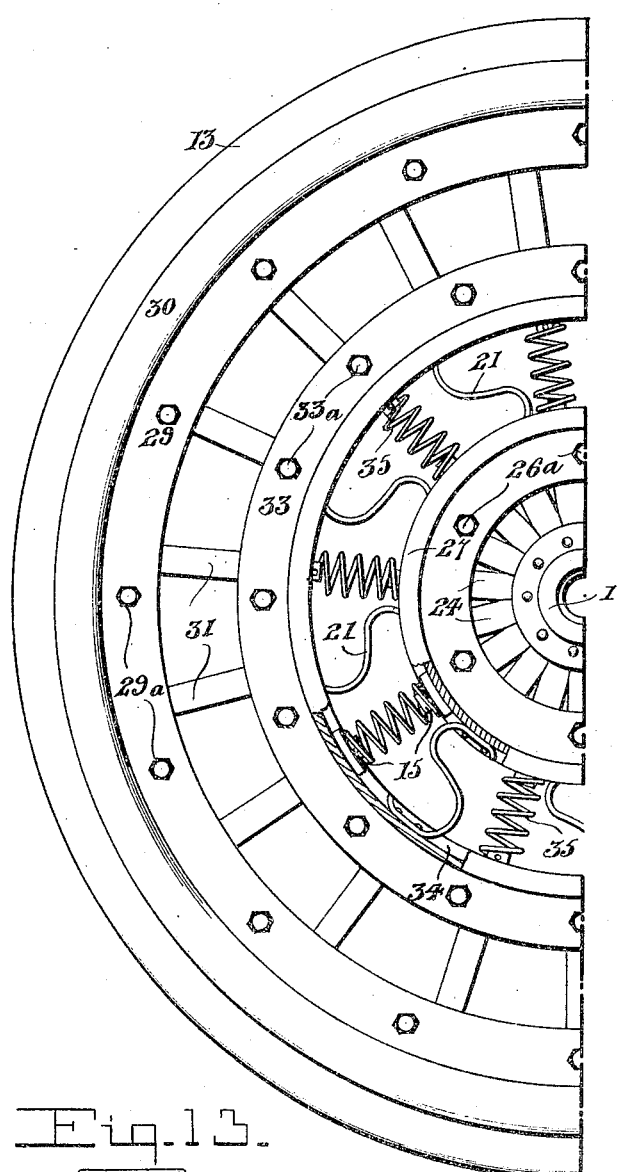
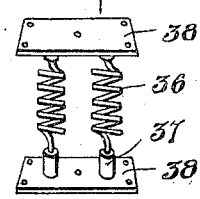
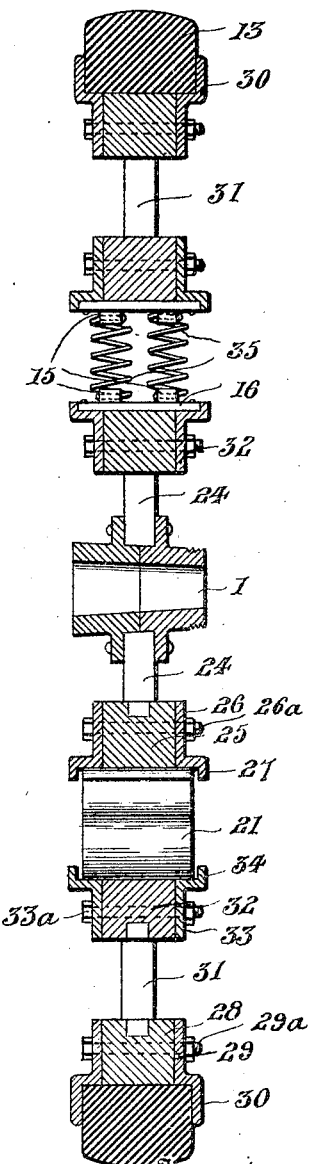
Inventor
J. J. Kovach
By J. R. Bryant
Attorney.

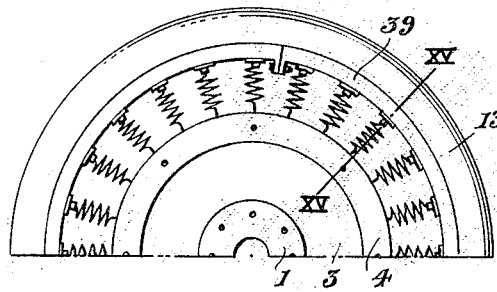
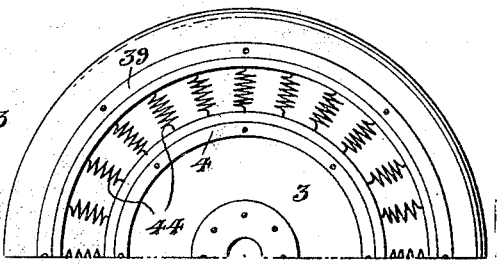
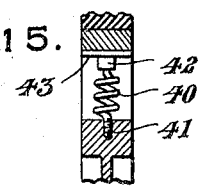
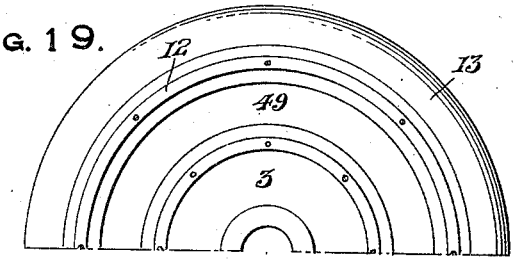
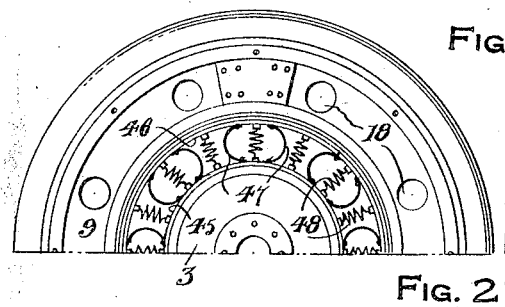
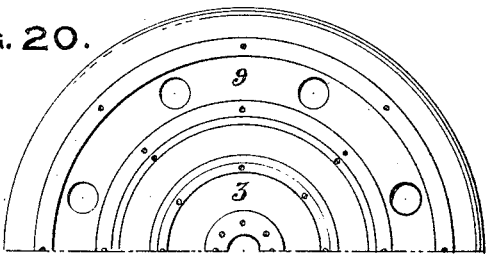
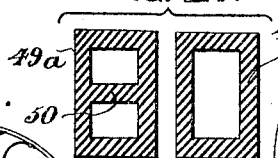
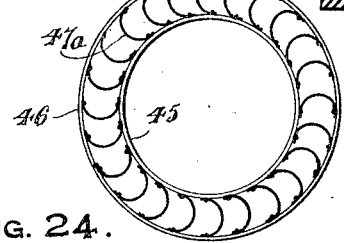
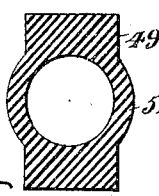
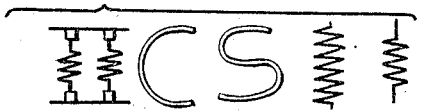

Patented Jan. 30, 1923.

1,443,478

UNITED STATES PATENT OFFICE.

JOHN J. KOVACH, OF NEMACOLIN, PENNSYLVANIA.

SPRING WHEEL.

Application filed April 18, 1922. Serial No. 554,633.

*To all whom it may concern:*

Be it known that I, JOHN J. KOVACH, a citizen of Czecho-Slovakia, residing at Nemacolin, in the county of Greene and State of Pennsylvania, have invented certain new and useful Improvements in Spring Wheels, of which the following is a specification.

This invention relates to certain new and useful improvements in spring wheels and has particular reference to the idea of constructing a wheel for any type of vehicle, more particularly for automobiles wherein a plurality of various types of springs are interposed between the hub and felly of the wheel.

The primary object of the invention resides in the provision of a spring wheel wherein a disk or web portion interposed between the wheel hub and felly is formed of concentric sections with spring devices interposed between the concentric sections, either a solid cushion tire or a pneumatic tire being carried by the outer disk or web section.

The invention further includes in a spring wheel of the type above set forth, spaced concentric rim sections with metallic springs interposed between the rim sections while side plates associated with the rim sections provide for a guiding and substantially telescopic movement between the rim sections.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view, partly broken away, of a spring wheel constructed in accordance with the present invention showing the cushion coil springs interposed between the inner and outer rim sections of the wheel disk or web, Figure 2 is a vertical cross sectional view taken on line II—II of Fig. 1 showing the cushion springs arranged in pairs transversely of the wheel with the side plates constituting guides for the outer movable rim section, Figure 3 is a fragmentary detail sectional view of a modified form of the outer rim section showing the felly portion thereof constructed for receiving a demountable pneumatic tire shoe, Figure 4 is a perspective view of the anchoring plate for the ends of the coil springs removed from the wheel, Figure 5 is a fragmentary side elevational view of a modified form of the invention showing coil and S-shaped springs alternately arranged between the inner and outer rim sections, Figure 6 is a cross sectional view taken on line VI—VI of Fig. 5, Figure 7 is a fragmentary side elevational view of another form of the invention showing S-shaped and arch springs interposed between the inner and outer rim sections and radial spokes constituting an integral part of the outer section and wheel felly, Figure 8 is a cross sectional view taken on line VIII—VIII of Fig. 7, Figure 9 is a fragmentary side elevational view of another modified form of the invention showing S-shaped and coil springs alternately arranged between the inner rim section and wheel felly with a different type of anchoring means for the coil springs and with radial spokes extending between the wheel hub and inner rim section, Figure 10 is a cross sectional view taken on line X—X of Fig. 9, Figure 11 is a fragmentary side elevational view of another modified form of the invention showing two separate sets of radial spokes with ring members carried by the adjacent ends of the sets of spokes, and with spring devices interposed between the ring members, Figure 12 is a cross sectional view of the modified form of wheel shown in Fig. 11, disclosing the two sets of radial spokes, the ring members carried by the adjacent ends thereof and the spring elements interposed between the ring members, Figure 13 is a perspective view of a modified form of spring and mounting plate therefor, Figure 14 is a fragmentary side elevational view of a modified form of wheel showing an inner disk portion, an outer sectional rim and cushion springs interposed between the disk and outer rim, Figure 15 is a detail sectional view taken on line XV—XV of Fig. 14 showing another mounting of the cushion spring, the inner end of the spring being threaded into the outer flange of the disk portion and secured at its outer end to a mounting plate.

Figure 16 is a fragmentary side elevational view of a modified form of wheel, similar to Fig. 14 showing the cushion springs threaded at their opposite ends into the inner disk and outer rim, Figure 17 is a fragmentary side elevational view of a modified form of wheel showing inner and outer disk portions with a spring device embodying inner and outer ring members bodily removable from the space between the inner and outer disk portions, Figure 18 is a side elevational view of the spring device employed with the type of wheel shown in Fig. 17, and showing a modified form of spring, Figure 19 is a fragmentary side elevational view of a modified form of wheel showing a rubber cushion band interposed between the hub and felly of the wheel, Figure 20 is a fragmentary side elevational view of a modified form of wheel showing inner and outer disk portions with a rubber cushion band interposed between the disk portions, Figure 21 shows sectional view of two cushion bands rectangular in cross section, Figure 22 shows a cross sectional view of another form of cushion band, Figure 23 is a side elevational view of the cushion band shown in Fig. 22, and Figure 24 shows different types of metallic springs for use in connection with the wheel.

Referring more in detail to the accompanying drawings, and particularly to Figs. 1, 2 and 4 there is illustrated a spring wheel embodying a two-part hub section 1, each section carrying annular flanges bolted as at 2 to a disk or web section 3 of the inner band 4. The outer ends of the band section 4 are bent outwardly as at 5 to provide side flanges, to which flanges circular side plates 6 are anchored as at 7.

An outer disk or web section 9 carrying an annular band 10 at its inner end is slidably disposed between the side plates 6, the outer edges of the band 10 being provided with inwardly bent flanges 11 for engagement with the inner faces of the die plates 6, the outer edges 8 of the side plates 6 normally extending outwardly of the web flange 10 to provide an extended guide between the plates and flanges 6 and 11. The disk or web section 9 carries a felly 12 that receives a solid rubber tire 13.

The spring devices associated with the wheel are interposed between the inner and outer band sections 4 and 10, the coil springs 14 being arranged transversely in pairs as shown in Figs. 1 and 2 and having the opposite ends thereof receiving the circular blocks 15 carried by the plate 16 that is anchored as at 17 to the opposed faces of the inner and outer bands 4 and 10, the springs also being anchored at their ends to said blocks. For purposes of reducing the weight of the wheel and also to provide for the application of a wheel lock, the outer disk or web portion 9 is provided with a series of openings 18 to accommodate a wheel lock.

From the above detail description of the form of the invention shown in Figs. 2 and 4 it will be noted that the hub 1 of the wheel is supported on the springs adjacent the lower side of the wheel, the spring being successively brought into play when the wheel is in motion and affording easy riding with the jars and shocks incident to travelling absorbed by the springs 14 and the cushion tire 13, the outer band section 10 being guided in its movements by the side plates 6 while the inner and outer disk or web portions 3 and 9 provide a wheel of great strength and rigidity.

A modified form of the outer disk or web section 9 is shown in Fig. 3 wherein the felly 12 is provided with a removable side flange 12$^a$ to receive a pneumatic tire 13$^a$, the remaining elements of the device being of similar construction.

A modified form of the invention is shown in Figs. 5 and 6 wherein the hub sections 1 engage the inner disk or web section 3$^a$, the band 4$^a$ carried by the outer end of the web section 3$^a$ being provided with inwardly directed ears 19 bolted as at 20 to the side plates 6$^a$. The outer disk or web section 9 has the inner band section 10 thereof telescopically disposed between the side plates 6$^a$, the outer edges 8$^a$ of the side plates extending outwardly of the flange 10 a sufficient length to accommodate relative movements between the side plates 6$^a$ and the flange 10 and substantially eliminating liability of any portion of the flange moving outwardly of the edges 8$^a$, while a single row of circumferentially disposed coil springs 14 are anchored at their ends by the blocks 15 carried by the plates 16. The outer disk or web section 9 carries a felly 12 to receive a cushion tire 13. As shown in Fig. 5 S-shaped springs 21 are alternately arranged with respect to the coil springs 14, the same being anchored at their ends to the inner and outer band sections 4$^a$ and 10 respectively. The operation of the wheel shown in Figs. 5 and 6 is substantially the same as that shown in Figs. 1 and 2, the outer disk or web section moving with respect to the inner disk or web section with the shocks and jars absorbed by the springs 13 and 21.

Another modified form of the invention is shown in Figs. 7 and 8 wherein the hub sections 1 are secured to the disk or web section 3ª with the band 4ª carried by the inner end of the web 3ª having inwardly directed ears 19 bolted as at 20 to the side plates 6ª, the outer edges 8ª of the side plates 6ª extending outwardly of the flange 10ª, carried by radial spokes 22 with a felly 12 mounted on the outer ends of the spokes for supporting the cushion tire 13.

A plurality of spring devices are interposed between the inner and outer band sections 4ª and 10ª, S-shaped springs 21 alternating with arch springs 23 arranged in pairs as clearly shown in Fig. 7.

A still further modified form of the invention is shown in Figs. 9 and 10 wherein the inner band section 4ª carries spokes 24 anchored to the sectional hub 1 while annular side plates 6ᶜ are secured to the ears 19 of the inner band 4ª. In this form of the invention the outer disk or web section is eliminated and a wheel felly 12ᶜ is directly positioned between the side plates 6ᶜ, the felly carrying a pneumatic tire shoe 13ª.

A plurality of spring devices is arranged between the band 4ª and the felly 12ᶜ, the spring devices being arranged in transverse pairs of alternate S-shaped springs 21 and coil springs 14, the springs 21 being anchored to the band 4ª and the felly 12ᶜ while the ends of the springs 14 are received in cups 15ª carried by the plates 16ª anchored to the band and felly respectively.

In the form of the invention shown in Figs. 11 and 12, the two-part hub 1 carries radial spokes 24 having a felly band 25 fixed to the outer ends thereof, the plates 26 being secured to the sides of the band 25 by bolts 26ª and carrying angular flanges 27 at the outer ends thereof spaced outwardly of said felly. The outer felly 28 of the wheel carries side plates 29 secured thereto by bolts 29ª and is provided with outwardly directed flanges 30 for confining the solid tire 13. A set of radial spokes 31 carried by the outer felly 28 are secured at their inner ends to the intermediate felly member 32, the latter carrying side plates 33 secured thereto by bolts 33ª having angular flanges 34 at their inner ends arranged in opposed relation with respect to the angular flanges 27 upon the side plates 26. A plurality of spring devices are interposed between the felly members 25 and 32, the same being arranged in alternate relation embodying pairs of coil springs 35 secured at their ends to plugs 15 carried by plates 16 secured to the felly members 25 and 32. Between each set of coil springs 35, an S-shaped band spring 21 is disposed, being of a width to extend laterally of the felly members 25 and 32 for engagement with the angular flanges 27 and 34 as shown in Fig. 12, the S-shaped springs 21 being secured at their opposite ends to said felly members 25 and 32.

The type of spring and mounting therefor shown in Fig. 13, may be employed in lieu of the springs 5, the springs 36 shown in Fig. 13 having axial end extensions received in sockets 37 carried by anchoring plates 38, the plates 38 being anchored to the felly members 35 and 32. The springs 36 are arranged in transverse pairs, as illustrated and may alone be employed, or used in connection with the S-shaped springs 21. Another form of the invention is shown in Fig. 14 wherein the hub 1 carries an inner disk portion 3 having a flange 4 at the outer end thereof surrounded by a split band 39 supporting a tire 13. A single circumferential row of coil springs 40 is positioned between the disk flange 4 and band 39, the inner end of each coil spring carrying threaded axial extensions 41 threaded into the flange 4 while the outer end of the spring carries an axial extension received in the socket 42 carried by the mounting plate 43 secured to the outer band 39, the detail construction of the spring 40 being clearly shown in Fig. 15.

In the form of the invention shown in Fig. 16, the coil springs 44 are threaded at their opposite ends for engagement with the flange 4 of the inner disk member 3 and the outer rim section 39.

In Fig. 17, the wheel embodies an inner disk portion 3 and an outer disk portion 9, the latter being provided with spaced openings 18 for the reception of a wheel lock, spring devices being interposed between adjacent flanges of the inner and outer disk portions. The spring device embodies concentric band members 45 and 46 positioned between the flanges of the disk members with springs permanently secured and movable with the band members 45 and 46. Various types of spring devices, may be employed Fig. 17 showing opposed curved spring members 47 spaced by coil springs 48, with a similar coil spring 48 positioned between the curved springs of each pair.

In Fig. 18, the curved springs 47ª are bent in the same direction and are permanently secured at their opposite ends to the inner and outer band members 45 and 46. In lieu of the form of springs shown in Figs. 17 and 18, the several types of springs disclosed in Fig. 24 may be employed in the combination desired.

In Figs. 19 to 23, an elastic band formed of rubber or the like is associated with the wheel in lieu of the metallic springs, Fig. 19 showing an inner disk portion 3 and an outer rim 12 supporting a tire 13, an annular rubber cushion member being interposed between the outer flange 4 of the inner disk 3 and the outer rim 12, the cushion band being designated by the reference numeral 49. Different types of cushion bands are shown in Figs. 21 and 22, the band 49ª being rectangular in cross section and provided with an internal circumferentially extending partition 50 providing separate air compartments. Another type of band is shown at 49$^b$ and the same is rectangular in cross section and is provided with a single air compartment. Fig. 22 shows still another type of band designated by the numeral 49$^c$, substantially rectangular in cross section and having a centrally positioned air compartment with outwardly bulged side walls 51, the band shown in Fig. 2, being illustrated in side elevation in Fig. 23.

The type of band shown in Fig. 22 is employed in connection with the type of wheel shown in Fig. 20 and is suitably secured in position between the inner and outer disk members 3 and 9 respectively by retaining rings (not shown).

From the above detail description it is believed that the construction and operation of each of the forms of the invention will at once be understood, it being noted that the hub section in each instance is resiliently supported by the springs interposed between the hub and wheel felly, the inner band section in each instance being rigidly supported on the axle while the outer band section or wheel felly is supported on cushion springs interposed between the respective sections.

While there are herein shown and described the preferred embodiments of the present invention, it is nevertheless to be understood that minor changes may be made therein without departing from the spirit and scope of the invention.

What is claimed as new is:—

1. In a spring wheel, a hub, an inner web section rigidly connected to the hub, laterally directed flanges carried by the outer edge of the inner web section, an outer web section, tire supporting means at the outer edge thereof, laterally directed flanges carried by the inner edge of the outer web section and cushioning elements interposed between said flanges.

2. In a spring wheel, a hub, an inner web section rigidly connected to the hub, laterally directed flanges carried by the outer edge of the inner web section, an outer web section, tire supporting means at the outer edge thereof, laterally directed flanges carried by the inner edge of the outer web section, cushioning elements interposed between said flanges, and annular guide plates secured to the flanges of the inner web section and inclosing the flanges of the outer web section.

3. In a spring wheel, a hub, an inner web section rigidly connected to the hub, laterally directed flanges carried by the outer edge of the inner web section, an outer web section, tire supporting means at the outer edge thereof, laterally directed flanges carried by the inner edge of the outer web section, cushioning elements interposed between said flanges, and annular guide plates secured to the flanges of the inner web section and inclosing the flanges of the outer web section, said cushioning elements including metallic springs having operative portions extending laterally of the radial axis of the wheel.

In testimony whereof I affix my signature.

JOHN J. KOVACH.